United States Patent [19]

Friedman

[11] 4,428,427

[45] Jan. 31, 1984

[54] CONSOLIDATABLE GRAVEL PACK METHOD

[75] Inventor: Robert H. Friedman, Houston, Tex.

[73] Assignee: Getty Oil Company, Houston, Tex.

[21] Appl. No.: 328,740

[22] Filed: Dec. 3, 1981

[51] Int. Cl.$^3$ .............................................. E21B 43/04
[52] U.S. Cl. ..................................... 166/278; 166/295
[58] Field of Search ........................ 166/276, 278, 295

[56] References Cited

U.S. PATENT DOCUMENTS

| | | | |
|---|---|---|---|
| 3,780,807 | 12/1973 | Graham et al. | 166/278 |
| 3,799,262 | 3/1974 | Knight | 166/270 |
| 3,867,986 | 2/1975 | Copeland | 166/276 |
| 3,929,191 | 12/1975 | Graham et al. | 166/276 |
| 4,018,282 | 4/1977 | Graham et al. | 166/278 |
| 4,081,030 | 3/1978 | Carpenter et al. | 166/295 |
| 4,110,275 | 8/1978 | Sifferman et al. | 166/276 |
| 4,127,173 | 11/1978 | Watkins et al. | 166/276 |
| 4,247,430 | 1/1981 | Constein | 166/276 |

*Primary Examiner*—Stephen J. Novosad
*Assistant Examiner*—William P. Neuder
*Attorney, Agent, or Firm*—Arnold, White & Durkee

[57] ABSTRACT

Sand or similar material coated with a polymerizable resin and catalyst is suspended in a viscous fluid carrier. Such a composition is useful for introduction into a wellbore to effect gravel packing of washed-out cavities surrounding the wellbore. The viscous fluid carrier serves to maintain a heterogeneous suspension of sand as the composition is flowed down through the wellbore, so as to prevent premature settling of sand into gradient layers and voids. The fluid carrier includes a polymeric thickener and a small concentration of viscosity-enhancing agent, such as a dye. The viscosity-enhacing agent is effective to alter the configuration of polymeric thickener so as to enhance the viscosity imparted thereby.

The sand or gravel included in the gravel packing composition is coated with a polymerizable resin and latent catalyst. At formation condition, the resin polymerizes and links together adjacent sand particles thereby forming a permeable consolidated structure which serves to reestablish washed-out zones near a wellbore. Corresponding methods for utilizing the compositions in gravel packing washed-out cavities surrounding a borehole are disclosed.

1 Claim, No Drawings

CONSOLIDATABLE GRAVEL PACK METHOD

BACKGROUND OF THE INVENTION

This invention relates to methods and compositions for gravel packing wells. More particularly, the invention relates to improved methods and compositions for consolidating gravel packs within wash-out cavities surrounding a wellbore.

Sand consolidation and gravel packing are two near wellbore techniques widely used for controlling the production of sand from producing wells such as oil wells, gas wells and similar boreholes. In many instances, highly porous and fragmentable sand formations surround a wellbore. Under production conditions, the sand is often displaced from its aggregated structure and carried along by the fluid flood operations to a producing well. If the sand flow is allowed to proceed unchecked, the producing wellbore soon becomes full of sand, thereby clogging the wellbore and impeding oil production. Furthermore, sand arriving at the surface site of the well erodes the production hardware.

As more and more sand is displaced from its original formation, a region of washed-out cavities surrounding the wellbore region results. As the washed-out zones become more extensive, the integrity of the wellbore is threatened and a danger of the wellbore collapsing exists.

It has therefore been the subject of extensive and intense research by the petroleum industry to develop techniques to minimize or obviate displacement of sand particles into producing well areas and prevent the formation of wash-out cavities surrounding the wellbore. One such general approach suggested by the art is to consolidate the coarse sand structures prior to fluid production. Sand consolidation techniques are aimed at cementing loose sand structures adjacent a wellbore. Such consolidation is effective to prevent breakdown of sand formations and subsequent clogging of producing wells.

However, there are many instances where substantial wash-out cavities are either initially present naturally near the wellbore or, which more frequently occurs, washed-out cavities form around the borehole after prolonged use despite attempts at sand consolidation.

When the problem of sand breakdown has progressed to a point where there are substantial wash-out cavities adjacent the wellbore, resort is made to gravel packing techniques to prevent further erosion and to reestablish the integrity of the wellbore periphery. Gravel packing is a secondary sand consolidation technique involving the introduction of a fluid suspension of exogenous particulate matter downhole, to fill the wash-out cavities. The term gravel is somewhat loosely applied in the art to encompass hard, rigid particulate matter ranging in size from a coarse sand to pebble size material.

Once the replacement of sand and gravel has been accomplished in the wash-out zones, something more must be done to conserve the loose filling material and retard the upstream sand flow through the filler material during production conditions. Generally, gravel packing is followed by the introduction of consolidating material to aggregate filler material such that a hardened permanent structure is obtained which serves as a barrier to the continuous erosion of indigenous sand.

One method that has been used for consolidating gravel packing involves the use of a polymerizable resin to bond the filler material together after initial placement. In this technique, a slurry of liquid resinous material and particulate filler material is pumped into the well. After placement, the thermosetting resin bonds the filler material together to a permeable, consolidated structure. Although this technique is technically feasible, it is quite expensive in its requirement for excess resinous material. Moreover, this technique requires special mixing equipment to ensure a homogenized dispersement of the particulate matter and prevent undesired sedimentation of the particulate matter from the resinous material upon introduction of the slurry down through the wellbore. Furthermore, controlled placement procedures are often required to guard against premature curing of the resin.

A variation of this technique involves a two step operation wherein the particulate matter is initially placed into the wash-out cavities and then a liquid resinous material is injected into the packed cavity to effect consolidation. Unfortunately, the problems associated with this variation is that the resin may fail to uniformly invade the packed cavity and coat all of the particulate matter or, as most often is the case, the polymerization reaction effecting consolidation is difficult to control. Consequently, the polymerization reaction may go unchecked, plugging pore spaces and ultimately blocking permeability through the packed material.

Another approach for consolidating gravel packs is to introduce particles coated with a one-step solid-fusible resin into the wash-out cavity of the subterranean formation. Formation conditions cause the resin to melt and fuse adjacent particles together, thereby creating a consolidated structure. A problem associated with this technique is that the consolidated structure decomposes when subjected to high temperatures such as that encountered during steam stripping procedures wherein the temperature within the formation may be as high as 600° F. At this temperature the fused resin begins to depolymerize, resulting in break down of the aggregated structure. Furthermore, there have been problems associated with placing the sand downhole. One cannot simly drop the sand downhole, rather it must be floated through the borehole to prevent rapid sedimentation of the sand and formation of voids. Accordingly, to prevent this rapid sand settling it is necessary to use a viscous fluid fill. Traditionally, polymers in relatively high concentrations have been incorporated in the fluid suspension of particulate matter to provide sufficient viscosity to suspend the sand polymer thickeners.

It is therefore desirable to provide improved compositions and methods for gravel consolidation which are cost effective, provide for controlled settlement, and are resistant to high temperatures after consolidation has been effected.

The present invention is directed to satisfying the aforementioned objectives. The invention is directed toward providing methods and compositions which are effective to prevent premature settling of particulate matter during well infusion and to provide a heat stable polymerized consolidate.

SUMMARY OF THE INVENTION

Applicant provides compositions for use in connection with gravel packing wells having washed-out zones. The compositions include a fluid carrier having suspended therein particulate matter. The fluid carrier so provided contains a polymeric material and a viscosity-enhancing agent such as dye compounds and, in particular, fluorescent dyes or optical brighteners. The viscosity-enhancing agent is a compound which in aqueous solution adsorbs to the polymeric material, (that is, possesses substantivity with respect to the polymeric material) and when so reacted is effective to increase the viscosity of the solution imparted by the polymeric material.

In a preferred embodiment of this invention, the particulate matter is gravel coated with polymerizable resin and two catalysts, a latent and nonlatent catalyst. At ambient surface temperatures, the nonlatent catalyst induces partial polymerization of the resin to form a partially polymerizable hardened outer coating of the gravel surface. At formation conditions, the latent catalyst facilitates additional polymerization which serves to link together adjacent gravel particles thereby forming a permeable, consolidated structure at the site of the gravel fill.

The amount of resin coated on the gravel in practice is preferably on the order of 5 to 12% based on the weight of gravel, and the latent and nonlatent catalyst are typically each on the order of 5 to 10% based on the weight of resin. These concentrations of course can vary depending on the individual characteristics of the selected resins, catalysts and well conditions.

In the gravel pack operations, the gravel matter suspended in the fluid carrier is floated downhole and permitted to settle as a heterogeneous packing of various sized particles. After settlement of the particulate matter in the regions of the washed-out zones, polymerization is completed in situ binding adjacent particles together into a permeable, consolidated structure. In one implementation of the invention the polymerization reaction was driven to substantial completion by injecting into the wellbore a solution of an ester of a weak organic acid after settlement of the gravel pack. The ester consumes the water generated by the polymerization condensation reaction. Uptake of the water of condensation shifts the polymerization reaction forward.

Laboratory tests have shown that the permeable, consolidated structure formed is resistant to high temperatures and moisture conditions often encountered during steam stripping operations.

DETAILED DESCRIPTION OF THE PREFERRED EMBODIMENTS

The invention will be described with reference to particularly preferred embodiments which constitute the best mode known to the inventor at the time of this application.

In accordance with a first preferred embodiment of this invention, a fluid carrier is provided. Such a carrier is adapted for the flowable introduction of consolidable particulate matter into a wellbore to achieve a uniform gravel packing of washed-out zones surrounding the wellbore. The carrier provides a viscous medium for the maintenance of a heterogeneous suspension of particulate matter during downflow of the suspension through the wellbore, so as to prevent premature settling of the particulate matter into gradient sedimented layers and layers having voids. The viscosity build up of the carrier fluid therefore desirably is that viscosity which can maintain a heterogenous suspension of particulate matter while subjected to well conditions for a period of time sufficient for the intact fluid suspension to reach the region of washed-out cavities.

The carriers thus provided within the context of this invention include a water soluble polymeric material which is capable of significant viscosity enhancement, and a small concentration of a viscosity amplifier (i.e., viscosity-enhancing) agent. A viscosity-enhancing agent is one which in aqueous solution absorbs to said polymeric material, and when so reacted is effective to increase the viscosity of the polymeric material.

Applicant prefers for use as the water-soluble polymeric material in connection with this invention, a cellulosic material. Particularly, preferred for use is hydroxyethylcellulose. Hydroxyethylcellulose is a nonionic ether of cellulose which is soluble in hot or cold water, but is insoluble in inorganic or organic solvents. Hydroxyethylcellulose is stable in concentrated salt solutions, and is nontoxic. The material may be obtained from various commercial sources including Hercules, Inc. of Wilmington, Del., which markets such a product under its trademark NATROSOL at various molar substitution levels. Applicant has employed in his experimental work the Hercules' products sold as NATROSOL 250HHR. NATROSOL 250 indicates a hydroxyethyl molar substitution of 2.5, and the HHR is an indication of the viscosity type.

Also useful in connection with the fluid carrier of this invention are water-soluble polymers such as the natural gums, other semisynthetic polymers of chemically treated natural polymers such as carboxymethyl cellulose, methyl cellulose and modified ethers and acetates, as well as the synthetic polymers, polyvinyl alcohol, ethlene oxide, and polyvinyl pyrrolidone. Applicant however has found it primarily desirable to use the semisynthetic celluloses due to their wide-spread commercial availability and relative inexpensiveness.

Viscosity-enhancing agents useful in preparing the carrier of this invention must possess two qualities. First, the agent must be able to stick or adsorb a molecule, a property referred to in the dye industry as "substantivity." Although this property is not exactly the same as generally referred to as reactivity, it is sufficiently close to use the terms "react" and "reaction" for ease of explanation, and that will be done in connection with this description. Second, the agent must be able to change the normally spherical configuration of the polymer to one which is more rod-like. Such a configuration change is effective to enhance the viscosity exhibited by the polymer molecule.

Applicant has discovered that these qualities which are required for a viscosity-enhancing agent are possessed by dyes and particularly by fluorescent dyes and optical brighteners which are designed to be applied during laundrying. Applicant thus prefers to use as the viscosity-enhancing agent an anionic fluorescent dye material. For example, the fluorescent dye material sold under the trademark TINOPAL CBS by Ciba-Geigy Corporation of Ardsley, N.Y., has been found to be useful in these contexts of use.

TINOPAL CBS is a distyryl biphenyl derivative namely, 2,2'-([1,1'-biphenyl]-4,4'-diyldi-2,1-ethenediyl) bisbenzenesulfonic acid, disodium salt.

This particular dye is anionic and has a solubility in distilled water of 25 g/l at 25° C., and 300 g/l at 95° C. TINOPAL CBS and other suitable fluorescent dyes possess substantivity with respect to hydroxyethyl cellulose in aqueous solution. Such a dye is effective to greatly increase the viscosity of hydroxyethyl cellulose in aqueous solution when it adsorbs to the hydroxyethyl cellulose molecules causing a transformation of the generally spherical configuration of hydroxyethyl cellulose to a more rod-like structure.

Another useful dye material, particularly preferred by applicant, is that marketed under the trademark BLANCOPHOR SV by BASF-Wyandotte.

The fluid carriers prepared in accordance with this invention are adapted for use in the presence of electrolytes such as salt, and are desireably adapted for use in the saline field water.

Further in accordance with the carriers provided by this invention, it may be desirable to employ a bactericide to prevent bacterial action while the fluid is being stored prior to its injection. A suitable bactericide might be, for example, a few drops of pine oil or a small concentration of sodium benzoate.

Various concentrations of the ingredients may be employed in the fluid carriers depending upon the particular conditions found in each well. For example, it will take considerably more polymer to give the satisfactory viscosity build up when the wellbore temperature is high than when the wellbore temperature is relatively low. Those skilled in the art will wish to determine the properties of a particular wellbore and then select the particular ingredients to be used, in particular quantities of such ingredients after such determination has been made. The concentration and selection of specific materials provided in the following example should be of assistance in that respect.

Applicant has found that the best results are surprisingly obtained from utilizing the fluid carrier of this invention when relatively small concentrations of the viscosity-enhancing ingredient and polymeric material are employed. For example, when using the semisynthetic celluloses, generally a solution ranging from 0.1 to 3% by weight will yield a sufficiently viscous solution. Furthermore, the incorporation of the viscosity-enhancing ingredient such as a fluorescent dye or optical brightener on the order of less than 1% by weight imparts a significant increase in the viscosity of the polymeric solution. Since the fluorescent dye is a very expensive material, the economics of a system using a large amount of such dye might be marginal at best. However it was subsequently and surprisingly learning that much better results are achieved when in the presence of electrolytes the dye concentration is much smaller, for example on the order of 0.03 to 0.05%. This lower percentage range corresponds to the fractions sufficient to saturate the polymer. That dye which does not specifically react with the polymer does not induce enhanced viscosity. The addition of a salt to the aqueous fluid carrier reduces the water-solubility of the dye thereby favoring reactivity of the dye with the polymer and assuring essentially all such dye will be reacted with a polymer rather than favoring dissolution of the dye in the aqueous environment.

Further, in accordance with the compositions of this invention, there is provided a fluid composition comprising particulate matter admixed with the fluid carrier described above. The fluid composition of particulate matter so provided is particularly useful for controlled settlement of gravel around the wellbore.

The particulate matter employed for purposes of this invention generally are referred to as gravel. Gravel as referred to herein is taken to include hard, rigid, generally spheroidal particles of material which is substantially inert to crude oil, natural gas, water, brine, and other fluids naturally encountered in subterranean formations and producing wells. The term is generally taken to include a sand, gravel and the like. However in addition to these naturally occurring materials, manufactured materials such as glass beads or ceramic particles and metallic pellets can also be employed. Applicant has found it convenient to use sand having a predominant portion of its particle size ranging from 15 to 40 mesh.

The fluid composition provided as indicated above is injected into a wellbore wherein the downward flow of particulate matter is maintained in a substantially heterogenous suspension so as to prevent premature settling of the particulate matter and formation of entrained fluids and voids within the wellbore. Sedimentation of the particulate matter will be achieved in a controlled fashion way resulting in a heterogenous dispersion of the particulate matter rather than a gradient layering of the particlate matter according to density.

Once the replacement of sand and gravel has been accomplished in the washed-out zones, the gravel packing may be followed by conventional consolidation techniques to aggregate the filler material such that a hardened permanent structure is obtained. For example, thermosetting resins may be introduced into the wellbore. Upon curing, the resin bonds the filler material together to a permeable, consolidated structure.

In accordance with yet another embodiment of this invention, the fluid composition is one which includes the fluid carrier having suspended therein particulate matter coated with a consolidable resin at well conditions, the resin first melts, and then fuses with the surrounding resin and finally cures to a hardened state aggregating the adjacent particles together into a permeable consolidated structure.

In the processes for preparing such coated particles, coupling agents such as silane may be included with the resins to improve wetting of the particles and bonding of the resin agent to the particle.

Various catalysts can also be incorporated in the consolidable coating encompassing the particulate matter. For example, the polymerization of resins can be catalyzed with either latent or nonlatent, acidic or basic catalysts depending upon the processing parameters desired. Typical latent acidic catalysts include the acid metal salts, such as zinc chloride; organic anhydrides, such as maleic and phthalic anhydrides; and methyl para-toluenesulfonate. Latent basic catalysts include hexamethylenetetramine and triethanolamine. Latent catalysts are desirably included in the consolidable resin coating for particulate matter, so as to effect polymerization and solidification at the higher temperatures (over 180° F.) normally encountered in a subterranean environment, while at ambient surface temperature there is neglible polymerization.

A nonlatent catalyst, either acid or basic, can also be incorporated in the coating for the consolidable resin to effect a partial consolidation or polymerization of the resin surrounding the particulate matter. The nonlatent catalyst effects polymerization and surface coating at ambient surface temperatures. However, as would be expected heat will accelerate the curing process.

In a particularly preferred embodiment of applicant's invention a fluid composition comprising the consolidable resin coated particles suspended in the fluid carrier is first heterogeneously mixed at the surface site of the wellbore. After a heterogenous distribution of the various sized particulate matter has been achieved, the fluid composition is introduced as a downward flow into the wellbore. As the fluid composition is continually pumped into the wellbore, the particulate matter is maintained in a substantially heterogeneously distribution by the carrier fluid which has a sufficient viscosity to retard settling of the gravel at excessive rates. As the particulate matter is deposited within the wellbore, the carrier fluid permeates the natural consolidated subterranean formations leaving behind a heterogeneous distribution of compacted particulate matter of gravel.

As the particulate matter is deposited within the wellbore, the combined action of catalyst and the higher temperature present within the subterranean formation completes the curing process of the resin coated particles to effect a permeable, consolidated structure.

In many instances as the polymerization reaction proceeds, water is produced as a by-product of condensation polymerization. If water production is allowed to go unchecked, the polymerization reaction will soon equilibrate leaving unreacted resin. However, applicant has discovered that by providing an ester of a organic acid suitably a lower alkyl acetate having from 1 to 4 carbon atoms to the reaction site, the by-product water is consumed in a hydrolysis reaction of the ester to its corresponding alcohol and carboxylic acid. For example, the inclusion of an ester of a weak organic acid, such as ethyl acetate or propylacetate each widely available as inexpensive organic solvents, in a post cure composition serves to check water production during consolidation of the resin within the wellbore. Accordingly, the polymerization reaction is driven to the desired degree of completion by the uptake of water in the ester hydrolysis reaction. Furthermore the elimination of water within the consolidating structure is desired since such water may cause blistering, warping and weakening of the final consolidated structure.

To further illustrate the invention, applicant has presented below an experiment examplary of the various embodiments discussed above, which should not be construed to limit the scope of this invention.

EXAMPLE

A fluid carrier was first prepared which included in 1 liter of aqueous solution, 5 grams Natrosol 250HHR hydroxyethyl cellulose, 0.5 grams Blancophor SV fluorescent dye and 100 grams sodium chloride. The salt was first dissolved in the water and while stirring slowly the Natrosol HHR was added. When the polymer was hydrated completely, the dye, Blancophor SV was slowly added to the stirred mixture.

Resin coated sand particles were made by adding 1 kilogram of sand 18-35 mesh sand to a mixer. Then 3 grams of hexamethylene tetramine were stirred into the sand as it was mixed, followed by slowly adding triethylene tetramine to the mixture while stirring. In a separate procedure, 60 grams of the resin FurCarb UP-520, a furfuryl novolak phenolic resin, marketed by Quaker Oats Company, Chemical Division, Chicago, Ill. were combined with 6 grams of Silane A 1100 a methyl trichloride substituted silicone purchased from Dow Chemical Co. Next, the combined Fur Carb and Silane was added very slowly to the sand mix while stirring.

The sand was then subjected to continued stirring until the sand no longer aggregated or clumped.

The polymer coated particulate matter was then suspended in the fluid carrier and mixed until a heterogenous suspension of the sand was accomplished. The suspension was then poured into an upright 1.5×6 inch pipe nipple, until fully packed. After the pipe nipple was fully packed the cap was topped off and the excess fluid carrier was drained. Next, the sand pack was flushed with a solution of ethyl acetate/white oil (1/1.5 v/v) which drove the remaining fluid carrier from the core sand deposit. Afterwards the core was placed in an oven to effect a cure of the resin coating. An outlet from the nipple was connected by tubing to the hood of the oven to vent gases evolving during the polymerization reaction. The core remained in the oven having a temperature first set at 150° F. for 2 hours and then reset to 300-400° F. overnight.

After the completion of the cure, a hard, permeable consolidation existed. The consolidated core was connected to a steam generator through which steam at 600° F. was passed through the core with a back pressure so that the pressure drop across the core was 100 psi. This operation was continued for 24 hours, at the end of which the consolidation appeared as it had prior to the test.

In the high temperature wells in which this technique is expected to be practiced, the coated sand is to be placed first and then the oil-ethyl acetate solution injected. A residence time of several hours is permitted to allow hydrolysis of the acetate, afterwhich heating with steam can be used then to complete the curing process. If for any reason, the consolidated aggregate must be removed or broken up this can be achieved with an oxidizing agent such as hydrogen peroxide or a hypochlorite.

Although the present invention has been described in terms of particular embodiments and example which applicant believes to represent the best mode of his invention at the time of this application, it will be recognized by those skilled in the art various changes may be made in the composition and method embodiment of this specification without departing from the scope of the invention as defined in the following claims:

What is claimed is:

1. A method for gravel packing a washed-out cavity adjacent a borehole penetrating a subterranean formation comprising the steps of:
   introducing into said borehole gravel particles suspended in a viscous fluid carrier, said gravel particles having a surface coating comprising a mixture of a polymerizable furfuryl novolak phenolic resin and catalyst;
   allowing said gravel particles to fill the washed cavities; and thereafter
   polymerizing the resin thereby bonding together the adjacent gravel particles to form a permeable, consolidated structure.

* * * * *